Sept. 6, 1949. R. WENDEL 2,481,054
LIGHT PROJECTOR
Original Filed Jan. 11, 1941 2 Sheets-Sheet 1
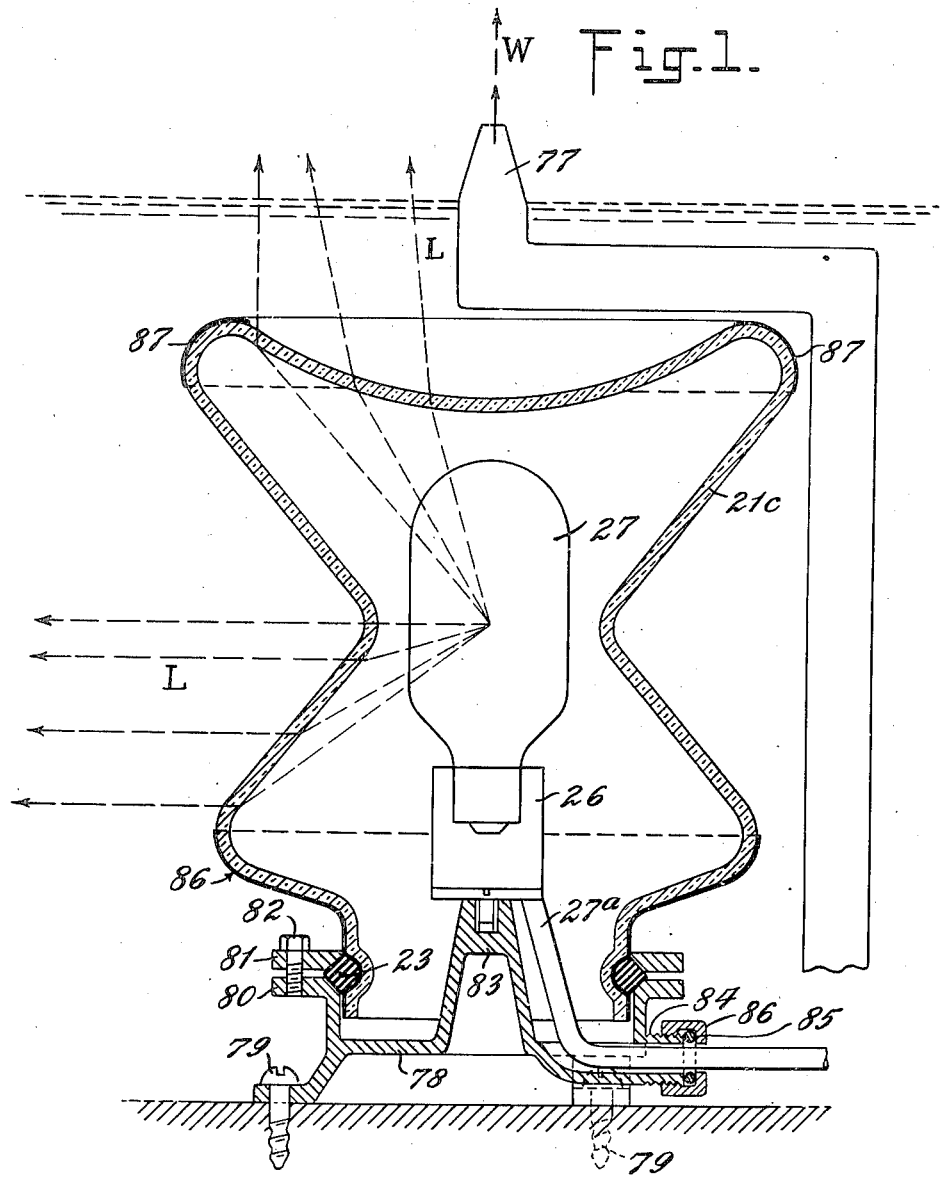
INVENTOR
Rudolf Wendel
BY
ATTORNEYS

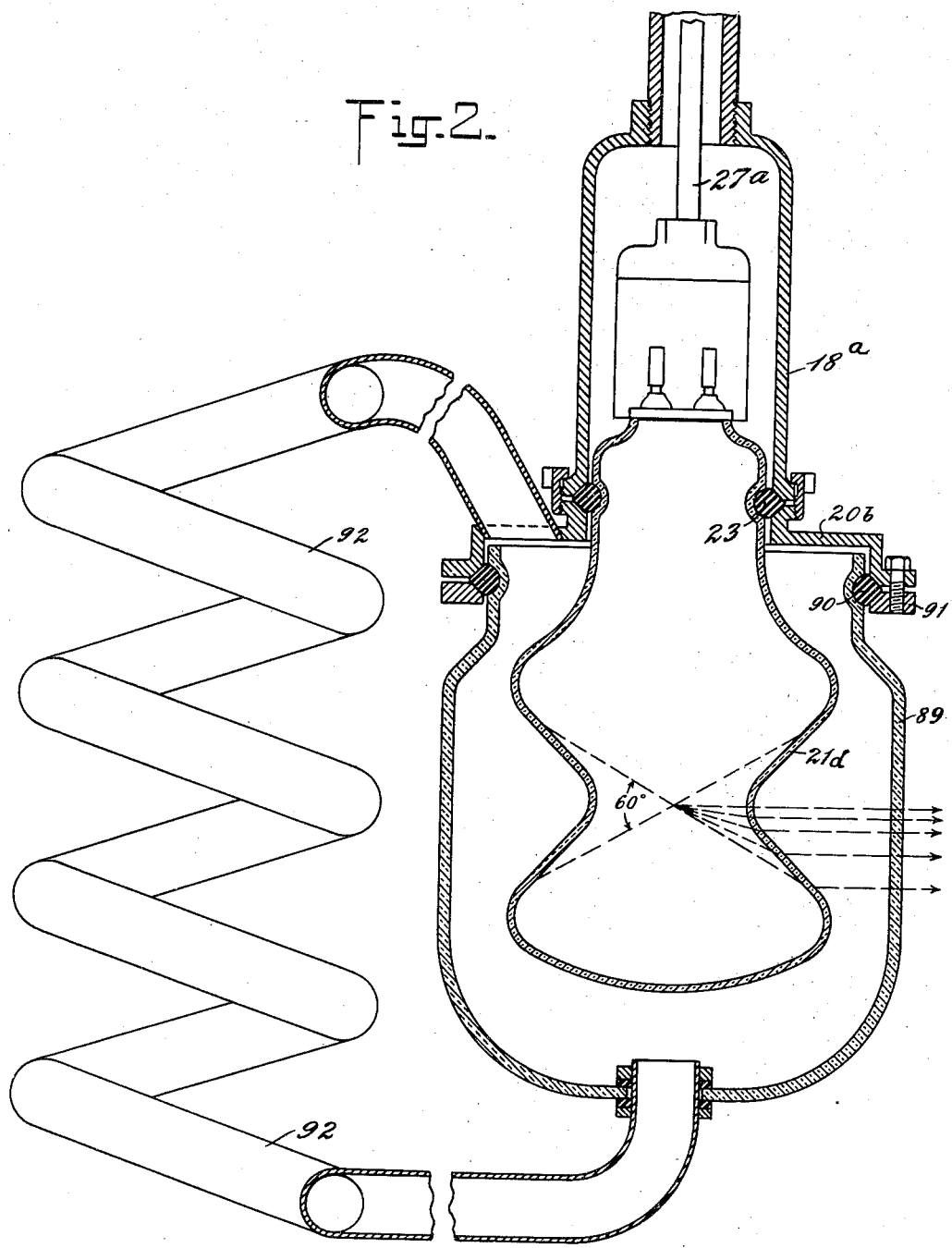

Patented Sept. 6, 1949

2,481,054

UNITED STATES PATENT OFFICE 2,481,054

LIGHT PROJECTOR

Rudolf Wendel, Roslyn Heights, N. Y.

Original application January 11, 1941, Serial No. 374,039. Divided and this application July 24, 1944, Serial No. 546,385

5 Claims. (Cl. 240—26)

The present invention relates to light projectors, and more particularly to projectors wherein the projected beam or beams are caused to travel along selected or predetermined paths.

This application is a division of my application Serial No. 374,039 filed January 11, 1941, which issued on July 25, 1944 as Patent No. 2,354,237.

It is the general object of the invention to provide a projector which is so constructed that it will direct the beam or beams in a selected direction or directions and with a predetermined width or spread of beam, the rays being either parallel in one or both of the horizontal and vertical planes (or any other coordinate planes), or diverging in any plane at any desired angle.

It is one of the objects of the invention to provide a projector which is capable of directing the rays of light either in a parallel beam or along a beam of any desired angular spread without the aid of glass lenses or the like, thereby to produce an extremely simple and inexpensive construction.

More particularly, it is an object of the invention to provide a projector which may be described as being of the "liquid lens" or, more specifically, "water lens" type, which is designed for immersion in a body of liquid, usually water, or to be surrounded by a, preferably circulating, body of liquid, and whose outer casing or bulb is shaped in dependence on the indices of refraction of its own material and of the surrounding liquid and in such manner that either a parallel-ray beam or a beam whose rays diverge at a predetermined angle is obtained.

It is a further object of the invention to construct a projector in such manner that selected regions about the same are uniformly illuminated thereby while the source of light is completely concealed.

Other objects of the invention will appear from the following detailed description of the invention.

Projectors constructed in accordance with the invention are suitable for use in practically all situations where uniform illumination, or illumination of limited areas or in certain directions is desired. Thus my improved projector may be used in swimming pools and in fountains beneath the surface of the water, or in lighthouse projectors, road illuminators, etc., being in the latter two and similar cases provided with a transparent jacket containing water or other liquid for providing the "water lens" and desirably also for cooling the lamp. In each case the water or other liquid into which the light is directed acts as part of the lens, the other part being the suitably shaped outer casing or bulb of the lamp proper. Where it is desired to conceal the source of light, as in the illumination of swimming pools, fountains, roadways, air fields and the like, this may be accomplished by shielding parts of the lamp in combination with suitable positioning thereof, as will be explained more fully hereinbelow.

The liquid lens provided by the present invention may be considered to be of plano-convex character, the convex surface of the lens being determined by the shape of the transparent outer casing or bulb of the projector. The shape of such casing or bulb is determined in accordance with well-known optical principles to cause the rays reflected on entering the body of liquid to travel in predetermined directions. The outer casing or bulb is preferably made in the form of a body of revolution and the body of liquid, generally water, contacting the outer surface of the casing or bulb, forms in effect an annular lens. When the projector is employed as a beacon, or for illuminating a fountain or the like, the lens will be effective through an angle of 360°; for use in a swimming pool, the angle of the beam will be about 180°, or slightly more, as explained below. The direction of the reflected rays will be determined primarily by the index of refraction of the liquid with reference to the medium inside the casing or bulb, the material of the casing or bulb itself being without effect upon such direction as the wall is made of as uniform thickness as possible.

The invention is illustrated by way of example on the accompanying drawings, wherein Fig. 1 illustrates a projector construction in accordance with the invention adapted to be positioned below the surface of the water in the well of a fountain for illuminating both the body of water in the well and the spray above the well; and Fig. 2 shows a form of construction suitable for lighthouse lamps, and for the illumination of roadways, air fields, and the like.

The projector shown in Fig. 1 is constructed to effect illumination both of the spray of a fountain as well as of the body of water in the well of the fountain. To this end the glass casing 21c is so shaped as to provide both a convex annular water lens about its central portion and a convex water lens at the top thereof to direct the beams along predetermined directions, while at the same time preventing the escape of light in directions meeting the eyes of observers about the fountain, so that the source of light remains concealed. The projector is preferably, although not necessarily, located directly below the nozzle 77 of the fountain and is supported directly from the bottom of the fountain by way of a bracket 78 which is secured to the fountain floor by screws 79 or the like. The bracket 78 is composed of a solid metal plate and serves as the bottom or closure for the lower, open end of the casing 21c. The bracket includes an annular flange 80 which is sealed against the bottom portion of the casing 21c with the aid of a sealing ring 23 of rubber or the like, the ring being pressed between the flange 80 and the casing by means of a clamping ring 81 which is secured to the flange by way of screws 82. The bracket 78 has a raised central portion 83 upon which the socket 26 of the bulb 27 is supported. The conductors are led from the socket by way of a metallic or other water-proof pipe 27a, the latter being led off through a threaded side extension 84 of the bracket, the end of the extension being sealed against the pipe by way of a sealing member 85 and union 86. The interior of the casing is thus protected against the entry of water.

To prevent light from reaching the eyes of spectators at the edge of the fountain, or at a distance therefrom, the outer edge portion at the top of the casing 21c is coated with a black paint, as shown at 87, or provided with any other suitable opaque covering; while a similar coating or covering 88 is provided at the bottom of the casing. The emerging rays of light L thus travel only in predetermined directions, the side rays being directed more or less horizontally into the body of water in the well of the fountain, while the upwardly travelling rays are directed more or less vertically against the spray of water W discharged by the nozzle 77. The lighting effect is one of great beauty as the drops of water in the spray take on the character of illuminated diamonds, while the body of water at the bottom of the fountain gleams with an internal luminescence whose source is not visible.

In the case of a fountain, the rays may diverge, depending on the size of the well, as much as about 30° in the vertical plane (i. e. about 15° to the horizontal) without rendering the source of light visible from above the surface of the water in the well. This is due to the fact that within an angle of about 15° to the horizontal, the light is reflected from the surface of the water back into the well, and where it is desired to illuminate also the floor of the well, the casing 21c will be constructed in such a manner as to cause the rays to diverge up to as much as 15° to the horizontal. The floor will then be illuminated both by rays reaching the same directly from the lamp and by rays reflected directly from the surface of the water.

In the construction of the outer casing 21c there are taken into account the direction from which the light strikes the inner wall of the casing, and the indices of refraction of the material of the casing and of the water. The effective portion of the casing is given a shape such that rays passing therefrom into the water will have a maximum angle of divergence of above 15° to the horizontal. With this limiting angle in view, and the indices of refraction of the material of the casing material and of the water being known, the shape of the casing can be readily determined by those familiar with the laws of optics.

The casing forms with the water adjoining the same a combination lens which in the form of the invention illustrated in the drawing can be considered as of plano-convex shape, the convex surface being provided by the outline of the lamp casing, and the plane surface by the body of water. It will be understood that the casing will be made of a material which can withstand the temperature differences to which it must be subjected in use. The lamp is effectively cooled by the water surrounding the same.

As will be clear from the above description, the projector will emit a beam through a predetermined horizontal angle, the rays being either parallel or having a limited degree of divergence. The light emitted by the projector is uniformly distributed through the body of water and then combined with the reflection of the light from the disturbed surface of the water into the body of water produces a shimmering and fluorescent effect which is very beautiful and gives the appearance of a uniformly illuminated and glowing mass of water. The total concealment of the source of the light further adds to the mysterious and magical effect.

The lamp can be readily constructed for mounting as a unit within the well, and broken parts can be easily and inexpensively replaced. All of the non-transparent parts immersed in the water may be made of or coated with a material, such as copper, bronze or the like, which is capable of withstanding the corrosive action of the water.

As shown in Fig. 1, the outline of the curved walls of the casing will be of generally parabolic shape in cross-section. The specific outline, as already explained, will depend upon the direction of the rays striking the casing from the interior, and upon the indices of refraction of the glass or other transparent material of which the casing is made, and of the water. The refractive index for glass may be taken as 1.5 while that of the water is 1.3 with reference to a value of 1 for air. The height of the annular water lens about the curved region can be varied within limits determined by the minimum safe distance between the casing and filament and by considerations of size. A height of lens which subtends an angle of about 71° at the filament has been found to be satisfactory.

The projector may, of course, be designed for a spread of 360°, as where the projector is to be used as a beacon, but usually a spread of less than 360° will be required.

Fig. 1 shows a construction in which the lamp filament is arranged along the central line of the projected beam; but it will be obvious that this relationship is not essential and that the shape of the casing can be altered to obtain any desired direction of beam. Also, the filament can be located elsewhere than at the approximate center of the casing, in which case the shape of the casing may assume a less regular or symmetrical form than in Fig. 1, for obtaining special lighting effects.

While the "critical angle" for water with respect to air, that is, the angle at which total reflection back into the water occurs, is about 41° to the horizontal, I prefer to limit the angle to the horizontal of the projected rays to about 15–20°, in order to avoid reducing too greatly the intensity of the beam in the region of the walls of the well, and also to avoid producing a brightly illuminated area on the bottom of the well close to the lamp.

For use in lighthouses and for the illumination of roadways, airports and the like, that is, in situations wherein the projector is not employed to illuminate a body of water, the construction shown in Fig. 2 presents a simple and inexpensive projector for obtaining a highly efficient illumination. In this form of the invention the outer casing may at the same time constitute the lamp bulb, as already indicated, or it may be designed to receive a separate lamp bulb as shown in Fig. 1. The sides of the casing 21d are shaped in the manner described hereinabove, and in accordance with the invention the casing is surrounded by a jacket 89 which is designed to receive a body of cooling water which at the same time acts as a lens against the curved and roughly parabolic outline of the casing. The casing may be secured in water-tight relation to a hood 18 in the manner described hereinabove, the lower clamping ring 20b serving at the same time as a suspension for the jacket 89 which, as shown, is made of glass or other transparent material. A sealing ring or gasket 90 seals the jacket against the ring 20b with the aid of a clamping ring 91. The water in the jacket circulates thermo-siphonically through a cooling coil 92 located externally of the jacket and connected in water-tight manner with the upper and lower portions of the jacket 89. It will be understood that the water in the jacket becomes heated during the operation of the projector and flows upwardly into the coil 92, and after being cooled in the latter, returns to the bottom of the jacket. The projector shown in Fig. 2 is designed especially for use in lighthouses and the outline of the sides of the casing 21d is so determined that the rays emerge in a more or less parallel beam from the projector. The beam may extend horizontally through approximately 360°, or for such fraction thereof as may be desired; in the latter case, suitable shields are provided, and, if desired, a reflector of the type shown at 36 in Fig. 1 of my above-mentioned patent may be located in the jacket 89 outside of the casing 21d, or inside of the latter when a separate light bulb is employed. The source of light may, of course, be either an incandescent filament, an electric arc, a fluorescent lamp, or the like.

It will be seen from the foregoing that I have provided a projector which is capable of directing the light rays along predetermined paths without the aid of any special lenses, or special cutting or grinding, the casing of the projector being of more or less uniform thickness throughout and being readily manufactured at a low cost. The distribution of light is both efficient and uniform, and as indicated above, highly ornamental effects can be obtained therewith when employed for illuminating either more or less stagnant or moving bodies of liquid.

In general, for use in lighthouses and for the illumination of airfields, roadways, and the like, an exactly or very nearly horizontal beam, i. e. one in which the rays are parallel or practically so, will be preferable, as thereby a more concentrated beam will be obtained, and the outline of the casing or bulb will be shaped accordingly to produce the requisite water lens effect.

In both of the constructions of Figs. 1 and 2, it will be observed, at least part of the respective casings are designed and positioned so as to direct a beam of more or less predetermined shape and direction into the atmosphere above or surrounding a body of liquid such as water forming a water lens with the respective shaped portion of the casing. In this respect the structure and function of the projectors described herein differ from the illuminating device for swimming pools and the like described and specifically claimed in my above-mentioned parent application.

The water supply line to the spray nozzle in Fig. 1 is advantageously inclined to the horizontal to avoid producing a shadow zone, while in the construction of Fig. 2 the thermo-siphonic circulation can, of course, be replaced by forced circulation by means of a pump, especially in the case of large, high-powered units.

The casing or bulb which forms the water lens is best constructed as a body of revolution, although this is not essential where the horizontal spread of the emitted beam is less than 360°. These parts are preferably made of well-annealed glass, although other transparent material, colored or not, may be used.

It will be understood that, as described more fully in my aforementioned patent, the sides of the casing in Fig. 1 are so shaped that the rays passing into the surrounding body of water in the well have a maximum angularity with reference to the horizontal plane that substantially no laterally directed light rays from the projector emerge from the surface of the well, so that no rays reach the eyes of spectators about the fountain, and the source of the illumination thereby remains concealed.

I claim:

1. The combination with a fountain structure comprising a well and means for forming a water-spray above the surface of the well, of a projector for illuminating the spray and the collected water in the well, comprising a transparent casing adapted to be supported in the wall of the fountain below the surface of the water, and a source of light within the casing, the sides of the casing being so curved as to shape the body of water about the same into the form of an arcuate lens which directs the rays into the body of water in a substantially horizontal direction, the upper portion of the casing being likewise curved to direct the rays upwardly into the spray and out of the line of sight of spectators about the fountain, whereby the source of illumination remains concealed.

2. A projector as set forth in claim 1, including shades at the upper and lower edges of the casing for preventing the emission of uncontrolled rays either into the atmosphere or against surfaces in the vicinity of the projector.

3. The combination with a fountain structure comprising a well and means for forming a water-spray above the surface of the well, said fountain having a nozzle above the well for producing the spray, of apparatus for illuminating the water in the well and in the spray of the fountain while concealing the source of light, comprising a projector located in the well beneath the nozzle, means for supporting the projector within the well and below the surface of the water therein, said projector including a transparent outer casing open at its bottom end, a socket for a lamp bulb within the casing, means for securing the open end of the casing to the support in water-tight manner, the side portions of the casing being of curved outline to form with the surrounding body of water an arcuate water lens of such configuration that light rays emanating from the bulb are directed through a horizontal arc into the water in an approximately parallel horizontal beam, whereby substantially no light rays from the projector emerge from the surface of the pool, and the top of the casing being likewise shaped to produce a water lens effect with the contiguous body of water to direct light from the bulb along a beam of predetermined form against the water spray from the nozzle.

4. Apparatus as set forth in claim 3 including shields arranged to prevent the emergence of light into the region approximately at the eye-level of spectators about the fountain.

5. Apparatus as set forth in claim 3 wherein the casing is so shaped that the rays passing into the body of water in the well of the fountain have a maximum angularity with reference to the horizontal plane such that substantially no rays from the projector emerge from the surface of the well.

RUDOLF WENDEL.

REFERENCES CITED

The following references are of record in the file of this patent:

UNITED STATES PATENTS

| Number | Name | Date |
|---|---|---|
| 465,516 | Berger et al. | Dec. 22, 1891 |
| 483,482 | Eldridge | Sept. 27, 1892 |
| 1,718,560 | Hollnagel | June 25, 1929 |
| 1,790,086 | Boerstler | Jan. 27, 1931 |
| 1,792,398 | Rothen | Feb. 10, 1931 |
| 1,839,994 | Proffatt | Jan. 5, 1932 |
| 1,895,887 | Lorenz | Jan. 31, 1933 |
| 1,973,132 | Wheat | Sept. 11, 1934 |

FOREIGN PATENTS

| Number | Country | Date |
|---|---|---|
| 424,862 | Germany | Feb. 5, 1926 |
| 541,952 | Germany | 1930 |
| 657,846 | France | 1929 |
| 797,767 | France | Feb. 24, 1936 |